United States Patent Office 3,573,171
Patented Mar. 30, 1971

3,573,171
LABORATORY REAGENT FOR ASSAY OF LACTIC ACID
Stanley Edward Green, Los Angeles, Calif., assignor to Smith Kline & French Laboratories, Philadelphia, Pa.
No Drawing. Filed Sept. 6, 1968, Ser. No. 758,120
Int. Cl. G01n *31/14*
U.S. Cl. 195—103.5            9 Claims

ABSTRACT OF THE DISCLOSURE

The speed and accuracy of known enzymatic assays for lactic acid containing fluids is improved by using a novel reagent assay comprising: the enzymes lactate dehydrogenase and glutamate-pyruvate transaminase, the coenzyme nicotinamide-adenine dinucleotide, a buffer, enzyme stabilizers, and a novel pyruvate ion trapping agent.

---

This invention relates to reagent mixtures useful for detecting and measuring substances producing lactic acid by enzymatic action.

In one aspect, the present invention relates to a novel reagent mixture. In another aspect it relates to a procedure for its use in the estimation of lactic acid in body fluids and tissues. In yet another aspect it relates to an article of manufacture comprising a novel reagent mixture in hermetically sealed unitary form.

The determination of lactic acid in blood and urine in man has become increasingly important; since it results from the glycolysis of glucose, being a blind alley in carbohydrate metabolism. Three classes or types of assay-procedures are currently employed; namely, chemical, enzymatic, and gas chromatographic. Of these, the enzymatic method affords the advantages of accuracy, high specificity for L-lactic acid in body fluids, ease of performance in the laboratory, high sensitivity, and inexpensive equipment requirements.

The enzymatic method for the lactic acid assay depends on the following chemical changes:

$$\text{lactate} + \text{NAD} \rightleftharpoons \text{pyruvate} + \text{NADH} + \text{H}^+$$

The conversion of lactate to pyruvate will go to completion, provided the latter product is trapped, and the reaction is carried out in an alkaline solution. In the presence of adequate amounts of the enzyme (LDH), lactate is oxidized to pyruvate, with the formation of reduced NAD, which absorbs light at wave length 340 m$\mu$. Measurement of the amount of change in light absorption permits calculation of the amount of lactate converted during the assay, and thus its concentration in the specimen being assayed.

Heretofore, the pyruvate-trapping agent most generally used in this assay was semicarbazide, as the hydrochloride salt ($NH_2$—CO—NH—$NH_2$·HCl).

This method is adequate for the determination of lactate, however, it requires about one half hour for the reaction to proceed to completion. There are certain medical applications where it is desirable to know where patient's blood concentration of lactate is as rapidly as possible. Additionally, the discovery of a reduced time for performing this determination represents a time saving for laboratory personnel.

It was observed that increasing the LDH and other components concentration in the aforementioned reaction sequence did not decrease the time to completion. It was concluded, therefore, that the rate of reaction of the semicarbazide was the limiting factor in achieving rapid determinations.

I have discovered that under certain reaction conditions glutamate-pyruvate transaminase (GPT) will catalyze the trapping of the pyruvate formed from lactic acid as follows:

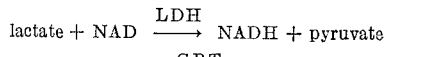

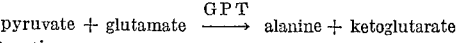

Net action:

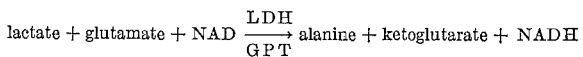

Under appropriate conditions, first disclosed here this reaction can proceed to completion in five minutes.

It is an object of this invention to provide a novel lactic acid measuring reagent which employs a trapping agent for the pyruvate ion produced in the enzymatic oxidation of lactic acid present in a biological fluid.

It is still another object of this invention to provide a lactate measuring reagent based on enzymatically catalyzed reactions, which employs a carbonyl trapping agent to which the enzymes are less susceptible to inhibition than has been possible heretofore.

It is a yet further object to provide a method of assaying for using a novel detecting reagent which employs a trapping agent which more quickly converts pyruvate than those employed heretofore.

It is still a further object to provide a novel lactate measuring reagent which employs a trapping agent that is relatively insensitive to high humidity and variable pH conditions for incorporation into a stable reagent used to assay for ethanol.

It is yet another object to provide an article of manufacture composed of a novel reagent mixture in a hermetically sealed unitary test form.

Further objects and advantages will become apparent to those skilled in the art from a study of the accompanying disclosure and appended claims.

The rate of hydrogen transfer is a function of several factors in the reaction mixture. When all factors are present in optimal amounts, this rate depends primarily on the rate of removal of pyruvate. The reaction proceeds slowly when semicarbazide is used as the trapping agent. The time to complete the reaction with semicarbazide is 30 to 60 minutes. It was discovered that the GPT-catalyzed conversion of pyruvate ion above gave considerably faster reaction rates. For example, in a reaction mixture containing GPT and glutamate, the time to complete the reaction varied from three to fifteen minutes, depending on the amount of pyruvate present. The advantage of a shorter analytical procedure, without loss of accuracy, is manifest in situations where frequent and rapid assays for lactate are the requirement.

Lactate dehydrogenase (LDH) and glutamate-pyruvate transaminase are among the many unstable enzymes. The more stable preparations of the crystalline enzymes involve suspension in strong solutions of ammonium sulfate. Such suspensions cannot be used in the reagent described below. Complete dryness is an essential property of all components of the reagent. Hence, lyophilization of the enzymes is imperative. The invention is directed to an article of manufacture in anhydrous form which is hermetically sealed to maintain stability during storage.

As is well known, enzymes of this type are generally very unstable. In fact, heretofore, in order to maintain enzymes of this type in a stable condition, it has been necessary to keep them in a concentrated form and at low temperatures. In addition to being concentrated, it has also been usually necessary for the enzyme solution or suspension to include a substantial amount of a salt such as ammonium sulfate to maintain optimal activity.

In the present invention, to prepare the assay material in a dry form, one of the steps in the process is to convert the enzyme from a solution to a dry, solid form such as a powder in which the enzyme is very stable.

To accomplish this, one or more stabilizing compounds may be added to the solution containing the enzyme. The particular stabilizers added to the enzyme solution will, in part, vary with the particular enzyme that is to be stabilized. However, for enzymes of this type, at least one stabilizer is chosen from one or more of the following groups. Under some circumstances it has been found to be advantageous to employ a combination of stabilizers which may include a stabilizer from several of the following groups or even a stabilizer from each group.

GROUP I

Mucilagenous gums or polysaccharides such as gum acacia, gum caarageenan, tragacanthin, alginic acid and pectin substances. Gum acacia has been found to be particularly well suited for this purpose. In addition to or as an alternative to the gums, the stabilizer may include other polymers containing hydroxy groups or other hydrophilic substitute groups which render the resultant polymer essentially soluble in water such as, polyvinyl pyrrolidine, carbowax and polyvinyl alcohol. This will also insure all of the assay material dissolving rapidly in the water when the reagent is prepared. However, it is also possible to use any other polymers which because of large chains or hydrophilic substituent is only partially soluble in water but which equilibrate with the aqueous phase such as ion exchange resins, ion exchange cellulose, carboxymethyl cellulose.

GROUP II

A buffer consisting of a hydroxyalkylamine including but not limited to primary amines such as tris (hydroxymethyl) aminomethane or a tertiary amine such as triethanolamine.

GROUP III

A sequestering or complexing agent such as ethylene diamine tetracetic acid or one of its salts which has been found to be particularly well suited.

GROUP IV

An inert soluble protein such as bovine serum albumin.

GROUP V

Salts of a polyvalent anion such as ammonium sulfate, or sodium potassium tartrate, which have been found particularly suitable.

After one or more of the stabilizers of the class described above has been completely dissolved or uniformly dispersed throughout the entire mixture, the enzyme or enzymes in the solution are very stable. It has been found that by adding these stabilizers to the solution, the activity of the enzymes is often increased. This is believed to result from the elimination of the effects of certain inhibitors which are usually present with the enzymes. In the event it is desired to decrease the activity of the solution, the solution may be diluted by adding water. Conversely, if it is desired to concentrate or increase the amount of activity of this enzyme solution, a portion of the liquid may be removed. Preferably, the liquid is removed by evaporation while the solution is maintained at a relatively low temperature. It may thus be seen that a very stable enzyme solution is provided at this point and that the stability of the solution is independent on the concentration of the enzyme or the salts therein and exhibits stability over a wider range of temperature.

It is an overall objective to provide an integrated assay material, which is dry, stable, enzymatic, pyridine nucleotide linked, and uniform in results under varying climatic and storage conditions.

The above described stabilized enzyme solution may be used for numerous purposes as a solution. However, under some circumstances such as the preparation of the present assay material, it may be desirable to convert the solution into a dry mixture or powder containing the enzyme. This may be accomplished by lyophilizing or freeze drying the solution. More particularly, the entire solution is frozen to provide a solid mass and placed under a vacuum. The vacuum is of sufficient magnitude to cause the frozen liquid to sublimate. The frozen mass is kept under this vacuum for a period sufficient to insure all of the water, etc., being removed. This will leave a solid residue that contains the enzyme or enzymes in intimate relation with the stabilizers, such as acacia, etc. These stabilizers are effective in preserving the activity of the enzyme for an extended period of time even though the enzyme is in the form of a solid.

The term stabilizer, as used herein, broadly relates to a substance which prevents the change or destruction of a reagent component. It has three major aspects in the present invention, namely: (1) to allow for convenient handling of the components during manufacture; (2) to permit the preparation and storage of a component in dry form; and (3) to provide long-term shelf-life of the finished product.

The residue will normally be in a fluffy or flaky condition. However, if it is desired, the residue may be ground until it is reduced to a finely powdered mixture. The grinding may be accomplished by any suitable means such as a ball mill. The fact that the powder mixture is substantially dry contributes to the physical stability of the mixture and substantially eliminates the tendency to compact or become lumpy, etc. Since the mixture can be maintained as a loose powder it will be easy to handle and process. Also, it can be easily measured either volumetrically or gravimetrically. At this point a powder is provided that includes one or more enzymes in a very stable form. Since the powder does not include any form of substrate, it can be used as an enzyme for any desired purpose. For example, among other things, the enzyme powder may be employed to complete the preparation of the present assay material.

In order to complete the preparation of the assay material the other components such as the buffers, substrates, coenzymes, and bulking-stabilizing agents, may be prepared for mixing with the stabilized enzymes. It is one of the primary purposes of the buffer materials to maintain the conditions suitable for the assay reaction to occur at an optimum rate. When the assay material is dissolved in water, the buffers will, among other things, be effective to maintain the pH of the liquid reagent. In addition, when the liquid reagent is, in turn, mixed with a specimen containing the unknown, the pH of the resultant specimen mixture will still be suitable for the assay reaction to occur.

The particular buffer material that is employed in any particular assay material will be dependent upon the particular assay reaction to be conducted and the other components in the assay material. However, normally, they will be in a class that includes the salts of polyvalent inorganic anions and organic amines together with the acids and salts thereof. By way of example, the salts of polyvalent inorganic anions may include at least sodium and potassium phosphates and sodium and potassium pyrophosphates. By way of example, organic amines and acids, and their salts may include at least tris (hydroxymethyl) amino-methane and imidazole (and their salts, such as the hydrochloride, succinate, sulfate), succinic, aspartic, and glutamic acids (and their salts such as the sodium, potassium and lithium), glycylglycine and glycine. Alkali metal hydroxides are preferred to provide the desired strongly basic pH.

The buffer materials may be prepared in the form of a dry powder that is mixed directly with the lyophilized powder containing the enzyme and the stabilizer. The resultant powder will contain the enzymes required for the assay reaction. Because of the stabilizers and buffers present in the powder, the enzymes will be very stable. This resultant powder like the enzyme powder first described, will not be hygroscopic, in contrast to corresponding mixtures prepared by lyophilization of the combined buffer and enzyme solutions.

When the assay material is dissolved to form a liquid reagent and the reagent is mixed with the specimen, the substrate will react with the unknown. However, in order for the reaction to occur successfully, it is necessary for the enzyme to catalyze the reaction. The quantity of the substrate and the amount of activity of the enzyme contained in the reagent are in excess of that required to cause all of the unknown to completely react. As a result the only factor that limits the assay reaction will be the quantity or amount of activity of the unknown.

The coenzyme NAD enters into the reaction and is converted from one form to another form. The extent to which the coenzyme is converted is determined by the extent to which the assay reaction progresses. The coenzyme may be readily converted from one form (such as oxidized) to another form (such as reduced). In addition the coenzyme has a light absorption at some particular wavelength only when it is in one of these forms. When it is in the other form, it is transparent at the designated wavelength, although the absorption band may be any desired wavelength that is convenient to use. However, it is desirable that it be distinct from the intense absorption bands of the rest of the components in the assay material and the substances in the specimen. This will insure all of the substances in the reagent and the specimen, except the coenzyme, being transparent or substantially transparent although some of the various components may absorb limited quantities of light in the region of the selected wavelength and they will not vary during the period of assay whereby the only variable will be the coenzyme in the absorbing form. Thus by measuring the optical density at the designated wavelength, the amount of the coenzyme converted may be determined. More specifically, by measuring the amount of change of the optical density at the designated wavelength, the amount or rate of the assay reaction may be measured. It has been found that NAD is particularly well suited for this purpose. When it is in its reduced form, it shows absorption of ultraviolet light with a maximum value at a wavelength of about 340 millimicrons.

Coenzymes of this class have a limited amount of stability in a solid form. They can be stored in a solid form for only short periods of time. The stability of the coenzyme may be increased by preparing a lyophilized powder of the coenzyme and acacia. Further increases in the stability of the coenzyme may be obtained by mixing with mannitol. Accordingly, the coenzyme may be ground into a powder and mixed directly with the lyophilized powder containing the enzyme, stabilizer, and buffer.

Heretofore, substrates, enzymes and coenzyme, and buffers have been dissolved in the solution containing the enzyme before lyophilization. The complete solution may then be lyophilized to provide a dry residue containing all of the components of the assay. However, it has been found, as a practical matter, the resultant assay material is often hygroscopic. As a consequence, the residue sometimes tends to absorb varying or unpredictable quantities of moisture. As a result when prepared in this manner it is desirable for the resultant mixture to be hermetically sealed within a container. However, even when hermetically sealed, the mixture may still be unstable and tend to develop colored specks due to local decomposition and in a fairly short time completely decompose or lose its activity. It has also been found that the mixture tends to form into lumps which makes it difficult to handle and measure into small units of identical amounts on a volumetric or weight basis.

This invention teaches that by preparing the various components of the assay such as the substrates and coenzymes in a dry or solid state, and in a stabilized form before mixing thereof with the lyophilized stabilized enzyme, a much more stable and easily handled assay material is now provided.

In addition to the foregoing components, it has also been found desirable to add a bulking-stabilizing agent to the mixture. This agent may be a polyhydric substance such as mannitol, sorbitol, lactose, polyvinyl alcohol or polymers having from 1 to 5 hydroxyl groups per monomeric unit. The bulking agent is not active in the assay reaction. Accordingly, the quantity of the bulking agent added to the assay material is not critical and may be varied throughout a wide range. However, the bulking agent performs several unexpected and useful functions. First of all, the bulking agent tends to further increase the stability of the assay material for several reasons. Such agents have the ability to absorb and retain limited quantities of moisture whereby the assay material is not materially affected when exposed to reasonable amounts of moisture. This increases the stability of the assay material and prevents its losing its activity. It has also been found that the bulking agent will also be effective in preserving the assay material by increasing the compatibility of its components. It has also been found that bulking agents of this category are also effective in increasing the ability of the assay material to withstand relatively high temperatures, such as 50° C., for longer periods of time. Heretofore, temperatures in this range have caused rapid deterioration of the enzymes, coenzymes, and other components.

Secondly, it has been found that the use of the bulking agent in the assay material results in the assay material dissolving more rapidly into water. This not only reduces the time required for preparing the liquid reagent but also increases the convenience of preparation by reducing the amount of stirring or shaking.

Thirdly, since the bulking agent does not enter into the reaction or affect the components in the assay material, the quantity of the bulking agent added to the assay material may vary over a wide range. Once a batch of the assay material has been prepared, its strength or amount of activity may be determined. The bulking agent may then be added to standardize the assay material to a predetermined level. This will result in the assay material always having a predetermined amount of activity per unit irrespective of the batch in which it is prepared. Of the agents listed above, mannitol is preferred.

After the assay material has had the bulking agent added, it may be divided into units of a standard predetermined size. The size normally will be just large enough to make a single assay or an integral number of assays. Each of these units may then be packaged into a container such as a capsule, glass vial, etc.

It will thus be seen that a plurality of substantially identical packages such as foiled tablets or capsules may be provided. Each of these tablets will contain just a sufficient quantity of the assay material for making a single assay of a specimen. In order to make an assay, a package containing the assay material for making the particular assay is selected. The assay material contained in the package is all pre-measured and of a predetermined activity. Accordingly, it may be dissolved directly in a standard amount of water so as to form a liquid reagent. This liquid reagent is then mixed with the specimen to produce an enzymatic reaction. The extent of which will be a function of the quantity of the original unknown. Accordingly, the optical density of the specimen at that wavelength will vary as a function of the unknown. Thus, by measuring the optical density of the medium at different times, it will be possible to compute the quantity of the unknown in the original specimen.

The invention sought to be patented in a first embodiment of a process of making aspect is described as residing in the concept of preparing an assay reagent, useful, inter alia, as an aid in the clinical diagnosis of pathological conditions to determine the presence of, or quantity of lactic acid in a biological specimen by mixing therewith a lyophilized, stabilized, catalytic reagent while in substantially anhydrous particulate form including the combination of the dry trapping agent glutamic acid or an alkali metal salt thereof, the dry enzymes lactate dehydrogenase, and glutamate-pyruvate transaminase at least one dry stabilizer from the class that includes mucilagenous gums, hydroxyalkylamines, ethylene diamine tetraacetic acid and its salts, an inert soluble protein and a sulfate anion, a dry coenzyme consisting of nicotinamide adenine dinucleotide, a dry buffer from the class that includes the salts of phosphates, organic acids and amines, and the salts of said acids and amines, and at least one dry stabilizing-bulking agent from a class that includes polyhydric substances and polymers of said polyhydric substances with from 1 to 5 hydroxyl groups per monomeric unit; which involves determining the optical density of the solid reagent after forming a liquid reagent therefrom and again following a predetermined incubation period after admixing the specimen.

The invention sought to be patented in a first composition of matter aspect, is described as residing in the concept of a substantially anhydrous solid reagent, useful, inter alia, as an aid in clinical diagnosis of pathological conditions to determine the presence of, quantity of, or amount of activity of lactic acid in a biological specimen by mixing therewith a lyophilized, stabilized, catalytic reagent while in substantially anhydrous particulate form including the combination of: the dry trapping agent glutamic acid or an alkali metal salt thereof, the dry enzymes lactate dehydrogenase and glutamate pyruvate transaminase at least one dry stabilizer from the class that includes mucilagenous gums, hydroxyalkylamines, ethylene diamine tetraacetic acid and its salts, an inert soluble protein and a sulfate anion, a dry coenzyme consisting of nicotinamide adenine dinucleotide, a dry buffer from the class that includes the salts of phosphates, organic acids and amines, and the salt of said acid and amines, and at least one dry stabilizing-bulking agent from a class that includes polyhydric substances with from 1 to 5 hydroxyl groups per monomeric unit.

Each substance above is present in that quantity so as to insure a rate of reaction catalyzed by the unknown being determined, to cause the reaction to go to completion.

Example

This novel reagent when fully prepared will consist of the dry mixture of the following substances:

Enzymes: Lactate dehydrogenase (LDH) glutamate-pyruvate transaminase (GPT)
Buffer: Glycine, potassium carbonate, potassium hydroxide (KOH)
Stabilizer: Tris-(hydroxymethyl)-amino-methane and its sulfate salt, ammonium sulfate, ethylenediamine tetraacetic acid, gum acacia and albumin.
Trapping agent: Potassium glutamate
Coenzyme: Nicotinamide adenine dinucleotide (NAD)
Bulking agent: Mannitol In order to prepare a large number of units of this assay material to produce a batch of a dry assay material or reagent that may then be divided into small quantities and packaged in containers such as capsules. Wherever quantities are specified, they are suitable for preparing a batch that will yield about 10,000 capsules. However, it should be understood that these values may be varied if it is desired to produce larger or smaller batches.

The first step in the procedure is to prepare a Tris-EDTA stabilizer solution. This may be accomplished by mixing the chemicals together in approximately the indicated quantities:

|  | G. |
|---|---|
| Tris (hydroxymethyl) aminomethane | 500–1,000 |
| Ammonium sulfate | 250–500 |
| Ethylenediamine tetraacetic acid, tetrasodium salt | 150–300 |

In order to mix these chemicals together, the tris (hydroxymethyl) aminomethane is dissolved in a volume of water that is somewhat less than 1 liter to form a first solution. If it is necessary to assist in this dissolving, the solution may be heated in a water bath. After the tris is completely dissolved, the solution is allowed to cool to about 25° C. and adjusted to about pH 7.5. This adjustment may be accomplished by adding sulfuric acid in the necessary quantities to convert part of the tris (hydroxymethyl) aminomethane to its sulfate salt. After the solution is brought to pH 7.5, sufficient water is added to bring the total volume to 1 liter.

Following this, a second solution is prepared by dissolving the ammonium sulfate in 850 to 900 ml. of water. This solution is adjusted to pH 7.5 by the addition of ammonium hydroxide. The first and second solutions may then be mixed with each other to form a resultant solution. The ethylenediamine tetraacetic acid, tetrasodium salt, may then be added to the resultant solution and dissolved therein to form a buffer solution which is sometimes hereinafter referred to as the tris-EDTA buffer.

A dry, lyophilized powder containing the lactate dehydrogenase (LDH) and GPT enzymes is then prepared. However, before this powder can be prepared, it is necessary to determine first the amount of activity in the LDH and GPT to be added.

In order to insure that the capsules produced from successive batches will be of identical activity, the activity of the LDH should be standardized at a predetermined level. By way of example, in a batch of 10,000 tablets, there may be about $1 \times 10^6$ International enzyme units for the entire batch, or about 100 units per finished tablet. The assay may be made by employing the following chemicals in about the indicated amounts:

|  | Ml. |
|---|---|
| Phosphate buffer, 0.1 M, pH 7.5 | 1.75 |
| Sodium pyruvate (3.3 mg./10 ml. of phosphate buffer: reagent 1) | 1.00 |
| NAD solution, 2.5 mg./ml. of 1% NaHCO$_3$ sol'n | 0.15 |

To begin the assay, the enzyme lactate dehydrogenase is diluted one part to 10,000 by mixing it with the phosphate buffer. A small quantity of the diluted enzyme, such as 0.1 ml. is mixed into a suitable quantity of the buffer solution containing the pyruvate and DPNH. The optical density of the mixture at a constant temperature such as 32° C. is then measured at suitable intervals such as one minute for an extended period such as ten minutes. By determining the average rate of change per minute of the optical density and multiplying by ten (if 0.1 ml. is used) the units of enzyme per milliliter of the diluted enzyme can be determined. Then, dividing by the number of milligrams of enzyme per milliliter, it will be possible to find the number of units of enzyme per milligram. From this, the number of milligrams of the enzyme required to produce the necessary units can be calculated. Similary, with the GPT enzyme.

In a typical manufactured batch of 10,000 tablets there will be about $65 \times 10^3$ International Enzyme Units of GPT for the entire batch, or about 6.5 units per finished tablet. The preliminary assay may be made by employing a reagent mixture assay for SGPT. One commercially available is "Eskalab" reagent tablets for SPGT determination, sold by the Smith Kline Instrument Company. The composition of this assay reagent is disclosed in copending application Ser. No. 561,757, filed June 30, 1966, particularly at pages 38 to 45 thereof.

To begin the assay for SGPT, the enzyme is diluted one part to 1,000 with a phosphoric buffer (0.1 M., pH 7.5). The procedure then followed is as described in the package insert for the afore-mentioned 'Eskalab' trademark reagent tablet.

Following this, the dry, lyophilized powder containing the LDH and GPT is prepared by mixing the following chemicals in the indicated ranges:

lactate dehydrogenase (the exact amount is determined by the above assay)—4–5 g.
glutamate-pyruvate transaminase—2–3 g.
acacia (gum arabic, white powder, U.S.P.)—2–6 g.
albumin—50–500 mg.
tris-EDTA solution—10–30 ml.
ammonium sulfate—15–40 g.

These chemicals may be mixed as follows. First, dissolve the acacia in a convenient quantity of distilled water, for example 80 to 160 milliliters. The albumin is then dissolved in a second quantity of water (for example, 10 milliliters). When fully dissolved, the two solutions are mixed. The tris-EDTA prepared in the beginning is then added to the solution. The solution is now placed under a vacuum for a period of time that will assure all of the trapped air in the solution being removed. The amount is then added to the solution. The resultant solution is then completely mixed to insure a uniform dispersion of the enzymes throughout the entire solution. The solution is then frozen and a vacuum applied to remove all of the water. The resultant lyophilized mixture will now be in a dry solid state in a quantity in the general range of about 20 to 25 grams. This dry mixture may then be mixed with dry crystals of ammonium sulfate. The dry mixture of solids may then be pulverized into a fine powder by any suitable means such as placing it in a ball mill for several hours.

After the powder is completely mixed and pulverized to a sufficient degree, an assay may be made of the mixture to determine the units of activity of the enzymes LDH and GPT in each milligram of the lyophilized powder. The next step is to distribute the lyophilized powder into the tablets. However, if it is desired to delay this step, the lyophilized powder may be stored for extended periods of time in a cold place such as a refrigerator or freezer. If this done, it is desirable to include a drying agent near the powder to prevent the absorption of any moisture.

In order to make the tablets, the following are mixed together. Normally, the quantities will be in about the indicated ranges:

(1) sodium carbonate (to give pH of 8–10.5)—300–900 g.
(2) glycine—350–1,050 g.
(3) potassium glutamate—40 g.±10%
(4) NAD—20–40 g.
(5) lactate dehydrogenase, lyophilized—as determined by assay below
(6) glutamate-pyruvate, transaminase—as determined by assay below The first two compounds in the above list are first ground together to form a dry mixture. The mixture is then placed under a vacuum at a temperature of about 50° C. for a sufficient number of hours to insure all of the moisture being removed. In addition, a drying material, such as phosphorous pentoxide, may be included in the oven to insure a complete drying. After the foregoing drying step, the glutamate salt and NAD are then added to the mixture formed by the first two compounds. Accordingly, the exact amounts of these compounds to be used are determined by the optimum amounts needed to produce a satisfactory reaction. Normally, these will be within the range indicated in the above table.

The resultant mixture of the four compounds is then pulverized into a fine powder, for example, by placing in a ball mill for several hours. When completely mixed into a homogeneous mixture, a small sample may be dissolved in water and the pH determined. If it is necessary, the pH should be adjusted so as to fall within the range of 7.5 to 11. If the pH is too low, additional sodium carbonate is added.

The amount of enzymes LDH and GPT is dependent upon the pH employed. It has been found that a pH of 10.8 requires the least amount of enzymes, however, the range of 7.5 to 11 may be employed.

A preferred method has been to prepare a mixture of components 1 thru 4 above, such that when $1/10{,}000$ of the mixture is added to 3 ml. of a 1% potassium hydroxide solution, a pH of 10.8 is obtained. This combined solution (buffer-glutamate-NAD) is then used to determine the amount of enzymes required as follows.

A sample of the lyophilized combined LDH and GPT is dissolved in water (30 mg./ml.). In a cuvette, 3.0 ml. buffer-glutamate-NAD solution, pH 10.8 and 0.2 ml. above enzyme solution are mixed. The cuvette is placed in a spectrophotometer set at 340 m$\mu$. The absorbance is recorded. To the cuvette is added 0.1 ml. of a 0.0010 M lithium acetate solution (carefully prepared). The change in $A_{340}$ is observed; it should be above 0.18. The time to complete this change is also observed. The amount of enzyme is adjusted so that the time required is a desired, usually five minutes.

The calculated amount (for 10,000 assays) of lyophilized LDH and GPT is then added to the previously mixed four components and resulting dry mixture thoroughly combined.

At this point, a powder is provided that contains the enzymes LDH and GPT, the coenzyme NAD and all of the buffers, trapping agent, and stabilizers, to insure the powder being in a stable state that will have a very long shelf life. A sample of this powder is withdrawn (being careful not to introduce moisture) and tested. The tests are for the appropriate optical density, homogeneity with respect to NAD and the effectiveness of the powder to form an assay for lactic acid. Accordingly, this powder may be divided into a plurality of small parts that are just large enough to contain the desired and appropriate quantities of buffer, enzymes, NAD, and glutamate to perform a lactic acid determination in 3 ml. Each part may then be enclosed in a suitable package such as a capsule that will protect the mixture from any moisture.

If a pharmaceutical gelatin capsule is used, a desiccant such as an alumina pellet should be placed with the capsule within the package.

Normally, between successive batches, there will be some variations in the size of the parts into which the mixture is divided as a result of variations in the activity of the enzymes. In order to make all of the parts of identical size in all batches, a standard package size in excess of the largest size that will be required is chosen. A suitable quantity of a bulking and stabilizing agent of a polyhydric substance, such as mannitol may then be added to the mixture to bring its volume up to an amount that will insure each of the parts having a volume that will just fill the package.

In order to make an assay of a serum for lactate using a tablet of this example, a specimen of the serum is first obtained in a quantity such as 0.1 milliliter. Following this, the contents of a tablet of this type are dissolved. The resultant solution will form a liquid reagent that is of just the right size to make a single assay, and then be mixed directly with the specimen. As soon as the reagent and specimen serum are mixed together, the following reactions will occur:

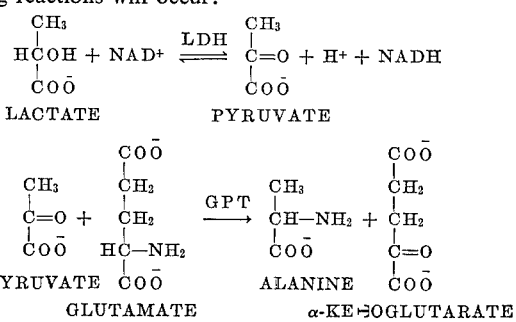

Since the glutamate, enzymes and NAD are supplied in the tablet in excess of that required for the reactions, the only limiting factor is the amount of lactic acid present. The pyruvate formed will thus be proportional to the amount of lactic acid. When the pyruvate then reacts with glutamate, it will be converted to alanine in direct proportion to the pyruvate formed. By placing the assay mixture in a suitable spectrophotometer and measuring the optical density at 340 millimicrons, the degree to which the provided NAD is reduced in the first step is measured without the competing reformation of lactic acid from pyruvate.

What is claimed is:

1. An assay material for assaying a specimen for the unknown lactic acid, comprising a solid, water-soluble substantially anhydrous, storage stable mixture of:
    (a) the enzymes lactate dehydrogenase and glutamate-pyruvate transaminase;
    (b) the oxidized coenzyme nicotinamide adenine dinucleotide;
    (c) glutamic acid, or an alkali metal salt thereof; and
    (d) a buffer capable of maintaining the pH between 7.5 and 11.0.

2. An assay material for assaying a specimen for the unknown lactic acid, comprising a solid, water-soluble substantially anhydrous, storage stable mixture of:
    (a) the enzymes lactate dehydrogenase and glutamate-pyruvate transaminase;
    (b) the oxidized coenzyme nicotinamide adenine dinucleotide;
    (c) glutamic acid, or an alkali metal salt thereof;
    (d) a buffer capable of maintaining the pH between 7.5 and 11.0;
    (e) an enzyme stabilizer selected from the group consisting of mucilagenous gums, hydroxyalkylamines, ethylenediamine tetracetic acid and its salts, a source of sulfate anion, and mixtures thereof; and
    (f) a stabilizing-bulking agent selected from the group consisting of mannitol, sorbitol, lactose and polyvinyl alcohol;
    further wherein (a) and (e) are a lyophilized mixture.

3. The assay material of claim 2 in which (d) is potassium carbonate, potassium hydroxide, and glycine.

4. The assay material of claim 2 in which (e) is gum acacia, tris (hydroxymethyl) aminomethane and its sulfate, ammonium sulfate, and EDTA.

5. The assay material of claim 2 in which (d) is potassium carbonate, potassium hydroxide, and glycine and (e) is gum acacia, tris (hydroxymethyl) aminomethane and its sulfate, ammonium sulfate and EDTA.

6. A method of assaying a specimen for lactic acid, using an assay material comprising a solid, water-soluble, substantially anhydrous mixture of:
    (a) the enzyme lactate dehydrogenase and glutamate-pyruvate transaminase;
    (b) the oxidized coenzyme nicotinamide adenine dinucleotide;
    (c) glutamic acid, or an alkali metal salt thereof;
    (d) a buffer capable of maintaining the pH between 7.5 and 11.0;
    (e) an enzyme stabilizer selected from the group consisting of mucilagenous gums, hydroxyalkylamines, ethylenediamine tetracetic acid and its salts, a source of sulfate anion, and mixtures thereof; and
    (f) a stabilizing-bulking agent selected from the group consisting of mannitol, sorbitol, lactose and polyvinyl alcohol;
    further wherein (a) and (e) are a lyophilized mixture;
        (i) dissolving in water said material, thereby to produce a liquid reagent having a measurable optical density;
        (ii) mixing said liquid reagent with said specimen to form a specimen-reagent assay mixture, and
        (iii) determining the amount of change in the optical density of the reacted specimen-reagent assay mixture.

7. The method of claim 6 in which (d) is potassium carbonate, potassium hydroxide, and glycine.

8. The method of claim 6 in which (e) is gum acacia, tris (hydroxymethyl) aminomethane and its sulfate, ammonium sulfate, and EDTA.

9. The method of claim 6 in which (d) is potassium carbonate and glycine and (e) is gum acacia, tris (hydroxymethyl) aminomethane and its sulfate, ammonium sulfate and EDTA.

References Cited

UNITED STATES PATENTS 3,413,198   11/1968   Devtsch _____ 195—103.5

OTHER REFERENCES

White et al.: Prin. of Biochem., 1964 (p. 378).

A. LOUIS MONACELL, Primary Examiner

M. D. HENSLEY, Assistant Examiner